United States Patent
Urushihara et al.

(10) Patent No.: US 6,619,255 B2
(45) Date of Patent: Sep. 16, 2003

(54) COMBUSTION EVENT INDICATIVE PARAMETER DEPENDENT CONTROL FOR AUTO-IGNITED COMBUSTION

(75) Inventors: Tomonori Urushihara, Yokohama (JP); Koudai Yoshizawa, Kanagawa (JP); Tsuyoshi Taniyama, Kanagawa (JP); Koichi Yamaguchi, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 85 days.

(21) Appl. No.: 10/001,971

(22) Filed: Dec. 5, 2001

(65) Prior Publication Data

US 2002/0073957 A1 Jun. 20, 2002

(30) Foreign Application Priority Data

Dec. 19, 2000 (JP) ........................................ 2000-385979

(51) Int. Cl.⁷ .............................. F02B 17/00; F02B 3/00
(52) U.S. Cl. .................. 123/295; 123/299; 123/406.22; 123/435
(58) Field of Search .......................... 123/37, 295, 299, 123/300, 305, 406.22, 406.45, 435

(56) References Cited

U.S. PATENT DOCUMENTS

| | | | | |
|---|---|---|---|---|
| 6,386,177 B2 | * | 5/2002 | Urushihara et al. | 123/299 |
| 6,401,688 B2 | * | 6/2002 | Teraji et al. | 123/295 |
| 6,497,213 B2 | * | 12/2002 | Yoshizawa et al. | 123/299 |
| 2001/0045200 A1 | * | 11/2001 | Urushihara et al. | 123/295 |
| 2002/0059914 A1 | * | 5/2002 | Yamaguchi et al. | 123/299 |

FOREIGN PATENT DOCUMENTS

JP          10-196424          7/1998

* cited by examiner

Primary Examiner—Tony M. Argenbright
(74) Attorney, Agent, or Firm—Foley & Lardner

(57) ABSTRACT

A system and method for controlling an internal combustion engine employs a split injection to create stratified air/fuel mixture charge. The stratified charge includes an ignitable air/fuel mixture portion around a spark plug within the surrounding lean air/fuel mixture and experiences a two-stage combustion. The first stage is combustion of the ignitable air/fuel mixture portion initiated by a spark produced by the spark plug, providing an additional increase of cylinder pressure. The second stage is auto-ignited combustion of the surrounding lean air/fuel mixture induced by such additional cylinder pressure increase. The system and method also employ generating a combustion event indicative (CEI) parameter related with combustion speed or ignition timing point of auto-ignition of auto-ignited combustion of the surrounding mixture, and determining control parameters of a spark timing controller and a fuel supply controller in response to the CEI parameter.

19 Claims, 12 Drawing Sheets

INTAKE STROKE
(FIRST INJECTION)

COMPLETION OF
INTAKE STROKE

COMPRESSION
STROKE
(SECOND INJECTION)

AROUND TDC
DURING
COMPRESSION
STROKE

FIG.12

| IF \ THEN | (1) Pw2 | (2) IT2 | (3) Pw1 | (4) IT1 | (5) IgT |
|---|---|---|---|---|---|
| (1) dP/dθmax IS GREATER THAN TA., | IS REDUCED. | IS RETARDED. | IS REDUCED. | IS ADVANCED. | IS RETARDED. |
| (2) Pmax IS GREATER THAN TA., | IS REDUCED. | IS RETARDED. | IS REDUCED. | IS ADVANCED. | IS RETARDED. |
| (3) θPmax IS EARLIER THAN TA., | IS REDUCED. | IS RETARDED. | IS REDUCED. | IS ADVANCED. | IS RETARDED. |
| (4) THE AMP. OF CYL. VIBRATION IS GREATER THAN TA., | IS REDUCED. | IS RETARDED. | IS REDUCED. | IS ADVANCED. | IS RETARDED. |

COMBUSTION EVENT INDICATIVE PARAMETER DEPENDENT CONTROL FOR AUTO-IGNITED COMBUSTION

BACKGROUND OF THE INVENTION

1. Field of the Invention

The present invention relates to a system and method for controlling an internal combustion engine capable of performing auto-ignited combustion.

2. Description of Related Art

JP-A 10-196424 discloses a technique to control ignition time or timing of auto-ignited combustion of homogeneous air/fuel mixture charge. This technique requires elevating the temperature of mixture charge during compression stroke to accomplish temperature slightly below a threshold level at which the charge would be auto-ignited at around top dead center (TDC). In order to cause such auto-ignition at a desired ignition timing point, this technique employs means for providing an additional increase of cylinder pressure to further elevate the temperature to or beyond the threshold level.

Examples of such means are proposed in the above-mentioned published Japanese application. One such example is a device employing a control piston to reduce the volume of a combustion chamber. Another is a device employing a spark plug to ignite a portion of the charge to allow thermal expansion. This thermal expansion compresses the remaining or surrounding charge to induce auto-ignited combustion thereof.

These proposed devices, however, possess their own distinct disadvantages. The device employing a control piston is not sufficiently simple. On the other hand, the device employing a spark plug is not effective enough to increase a cylinder pressure to accomplish a sufficiently high level if the homogeneous air/fuel mixture charge is lean and has an air/fuel ratio greater than the stoichiometric air/fuel ratio.

SUMMARY OF THE INVENTION

The present invention aims at keeping such additional increase of cylinder pressure sufficiently high enough to induce auto-ignited combustion of lean air/fuel mixture without any complicated structure.

An object of the present invention is to provide a system and method for controlling an internal combustion engine such that, without any complicated structure, such additional increase of cylinder pressure is always kept sufficiently high enough to induce auto-ignited combustion of air/fuel mixture.

Another object of the present invention is to provide an internal combustion engine in which such additional increase of cylinder pressure is always kept sufficiently high enough to induce auto-ignited combustion of air/fuel mixture.

According to the present invention, there is provided a system for controlling an internal combustion engine capable of performing auto-ignited combustion, using a spark timing controller and a fuel supply controller, which have disparate control parameters, the system comprising:

at least one combustion chamber;

a spark plug arranged to produce, under control of the spark timing controller, a spark within the combustion chamber at a predetermined location;

a fuel supply device operable to perform, under control of the fuel supply controller, a first fuel injection, for each engine cycle, to create a first air/fuel mixture within the combustion chamber and a second fuel injection, in the same engine cycle, to localize fuel to create, in the neighborhood of the spark plug, a localized second air/fuel mixture portion, which is ignitable by the spark produced at the predetermined location;

a combustion event indicative (CEI) parameter generator for generating a CEI parameter related with one of combustion speed and ignition timing point of auto-ignition of auto-ignited combustion of the first air/fuel mixture, within the combustion chamber, which follows spark-ignited combustion of the second air/fuel mixture portion; and a control parameter generator for determining at least one of the control parameters in response to CEI parameter and generating the determined control parameters.

BRIEF DESCRIPTION OF THE DRAWINGS

The present invention will be more fully appreciated as the same becomes better understood from the following detailed description when considered in connection with the accompanying drawings, in which like reference numerals and characters designate like or corresponding parts through the several views.

FIG. 12 is a table illustrating four examples of control strategy according to the present invention.

DETAILED DESCRIPTION

Figure 3:
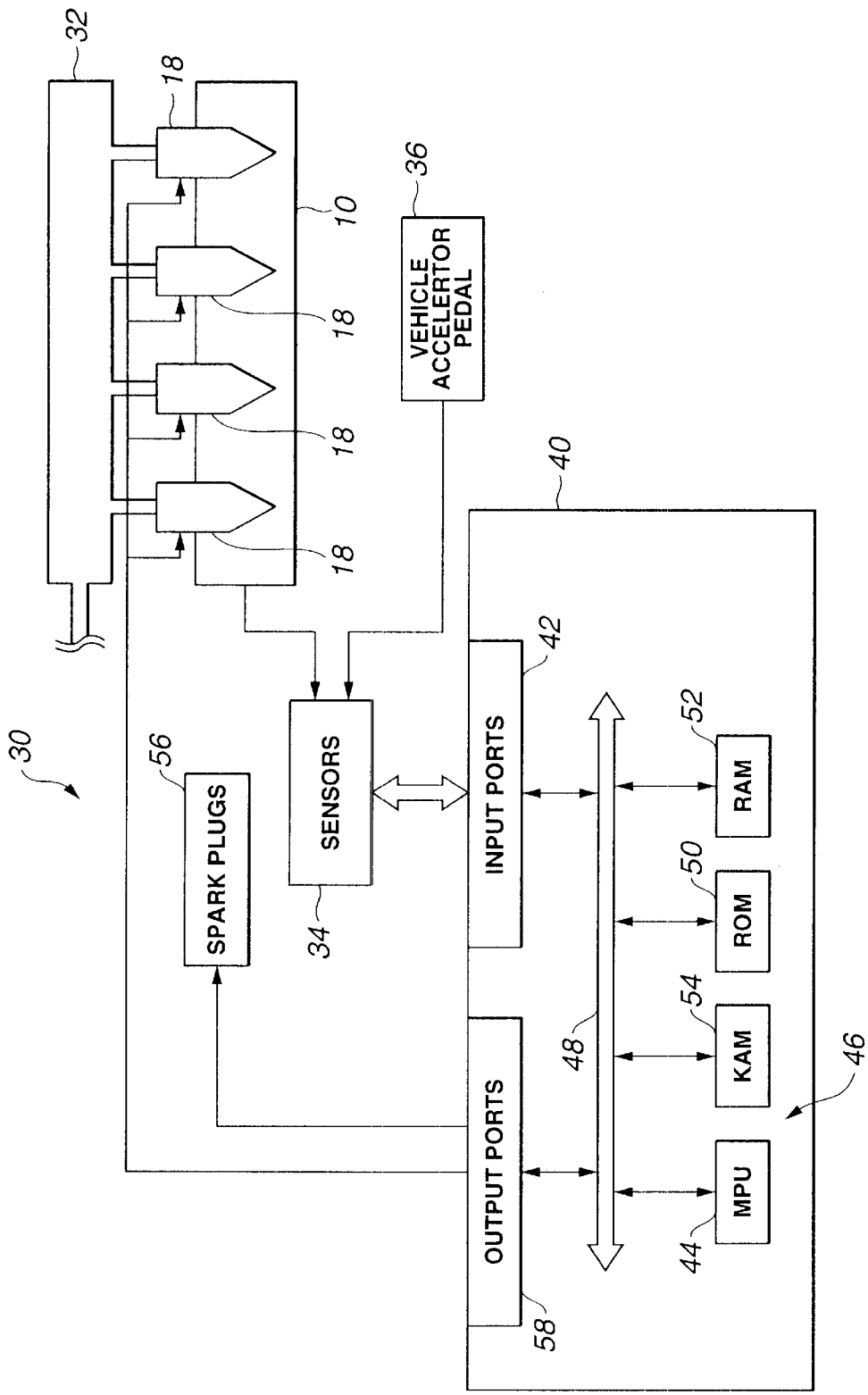
FIG. 3 is a block diagram illustrating components of an electronic engine controller (EEC).

Referring now to FIG. 3, a system for controlling an internal combustion engine is shown. The system, generally indicated by reference numeral 30, includes an engine 10 having a plurality of cylinders each fed by fuel injectors 18. The fuel injectors 18 are shown receiving pressurized gasoline fuel from a supply 32 which is connected to one or more high or low pressure pumps (not shown) as is well known in the art, Alternatively, embodiments of the present invention may employ a plurality of unit pumps (not shown), each pump supplying fuel to one of the injectors 18.

Figure 1:
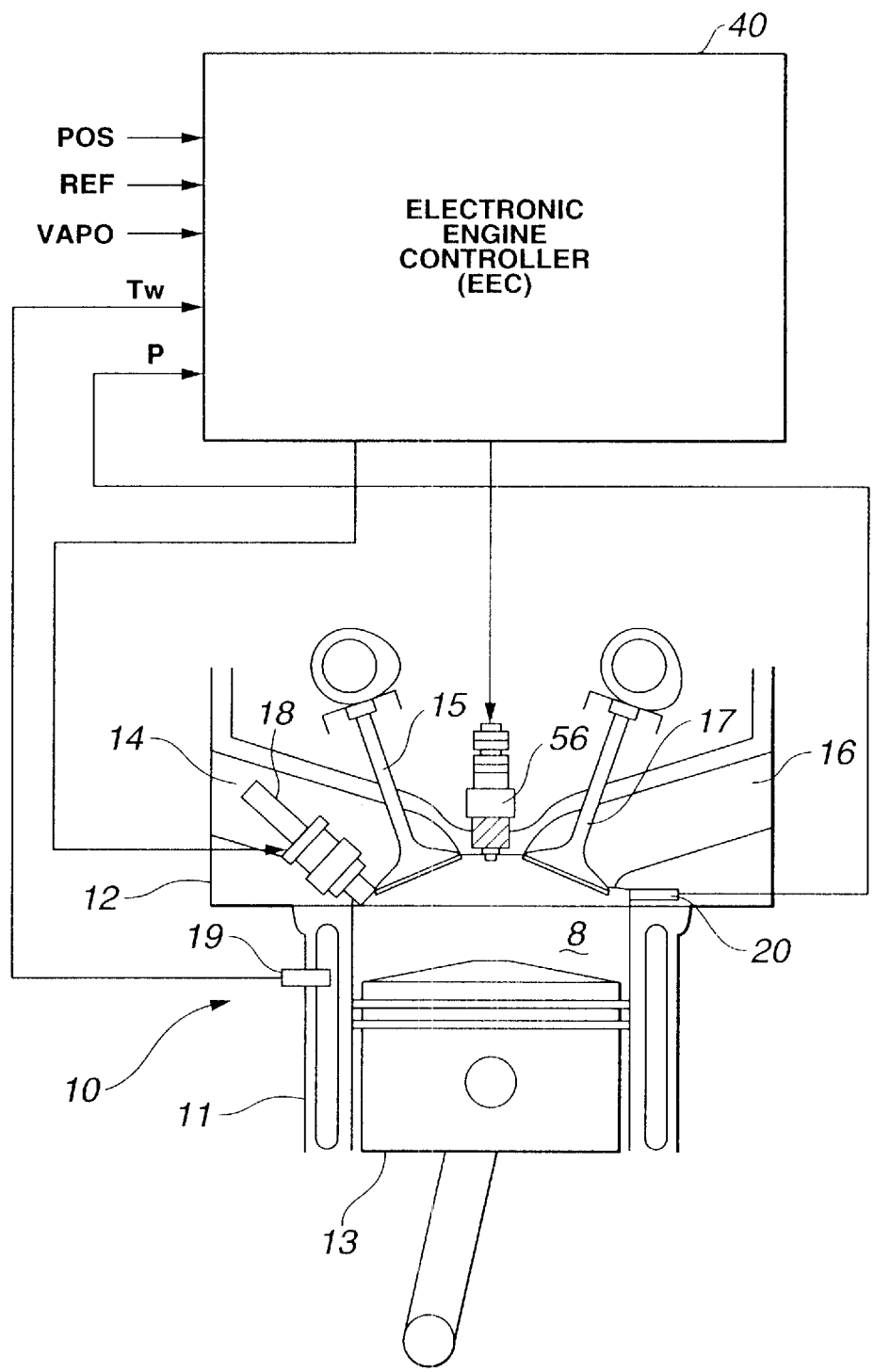
FIG. 1 is a block diagram illustrating a system and method for engine control, which provides auto-ignited combustion according to the present invention.

Referring also to FIG. 1, in a preferred embodiment, engine 10 is a four-stroke cycle internal combustion engine capable of operating on combustion type required, i.e., auto-ignited combustion, and spark-ignited combustion. The engine 10 includes a cylinder block 11 formed with a plurality of cylinders, only one being shown. A cylinder head 12 is attached to cylinder block 11 and closes the cylinders. As illustrated, each cylinder receives a reciprocating piston 13. The piston 13, cylinder and cylinder head 12 cooperate with each other to define a combustion chamber 8. The cylinder head 12 has two intake ports, only one being shown at 14, and two exhaust ports, only one being shown at 16, communicating with the combustion chamber 8. Intake and exhaust valves 15 and 17 are provided for admitting fresh air into the combustion chamber and for discharging exhaust gas from the combustion chamber, respectively. Two intake valves 15 close the two intake ports 14, respectively. Two exhaust valves 17 close the exhaust ports 16, respectively. The fuel injectors 18 are mounted to the cylinder head 12, each spraying fuel directly into the combustion chamber in one of the cylinders.

Referring back to FIG. 3, the system 30 may also include various sensors 34 for generating a sensor signal indicative of combustion event in one of the cylinders, and sensor signals indicative of corresponding operational conditions of engine 10 and other vehicular components. Referring also to FIG. 1, in this preferred embodiment, sensors 34 include an engine coolant temperature sensor 19, a combustion event indicative (CEI) sensor 20, a crankshaft sensor and an accelerator pedal sensor. Engine coolant temperature sensor 19 detects temperature of the engine coolant and generates an engine coolant temperature indicative signal Tw. CEI sensor 20 generates a sensor signal indicative of combustion event in one of the cylinders. CEI sensor 20 may be a pressure sensor, which detects cylinder pressure in one of the cylinders and generates a sensor signal indicative of variation of cylinder pressure due to combustion of charge in the cylinder. CEI sensor 20 may be a knock sensor, which detects cylinder vibration and generates a sensor signal indicative of amplitude of cylinder vibration due to combustion of charge in the cylinder. The crankshaft sensor generates a position (POS) signal each time the crankshaft advances through a unit crank angle of 1 degree, and a reference (REF) signal each time the crankshaft advances a predetermined reference crank angle of 180 degrees in the case of four cylinders and 120 degrees in the case of six cylinders. The accelerator pedal sensor is coupled with a vehicle accelerator pedal 36 (see FIG. 3) through which the vehicle operator can express torque demand. Accelerator pedal 36 generates a vehicle accelerator pedal opening (VAPO) signal indicative of opening angle or position of the accelerator pedal 36. The sensors 34 are in electrical communication with an engine controller 40 via input ports 42. Controller 40 preferably includes a microprocessor 44 in communication with various computer readable storage media 46 via data and control bus 48. Computer readable storage media 46 may include any of a number of known devices, which function as a read-only memory (ROM) 50, random access memory (RAM), keep-alive memory (KAM) 54, and the like. The computer readable storage media 46 may be implemented by any of a number of known physical devices capable of storing data representing instructions executable by a computer such as controller 40. Known devices may include, but are not limited to, PROM, EPROM, EEPROM, flash memory, and the like in addition to magnetic, optical, and combination media capable of temporary or permanent data storage.

Computer readable storage media 46 include various program instructions, software, and control logic to effect control of engine 10. Controller 40 receives signals from sensors 34 via input ports 42 and generates output signals that are provided to fuel injectors 18 and spark plugs 56 via output ports 58.

With continuing reference to FIG. 3, the MPU 44 determines the type of combustion required: auto-ignited combustion or spark-ignited combustion, and determines the type of fuel injection required: split or single. MPU 44 may make such determination by relying on combustion type map shown in FIG. 10 using current values of engine speed and load request.

Figure 2:
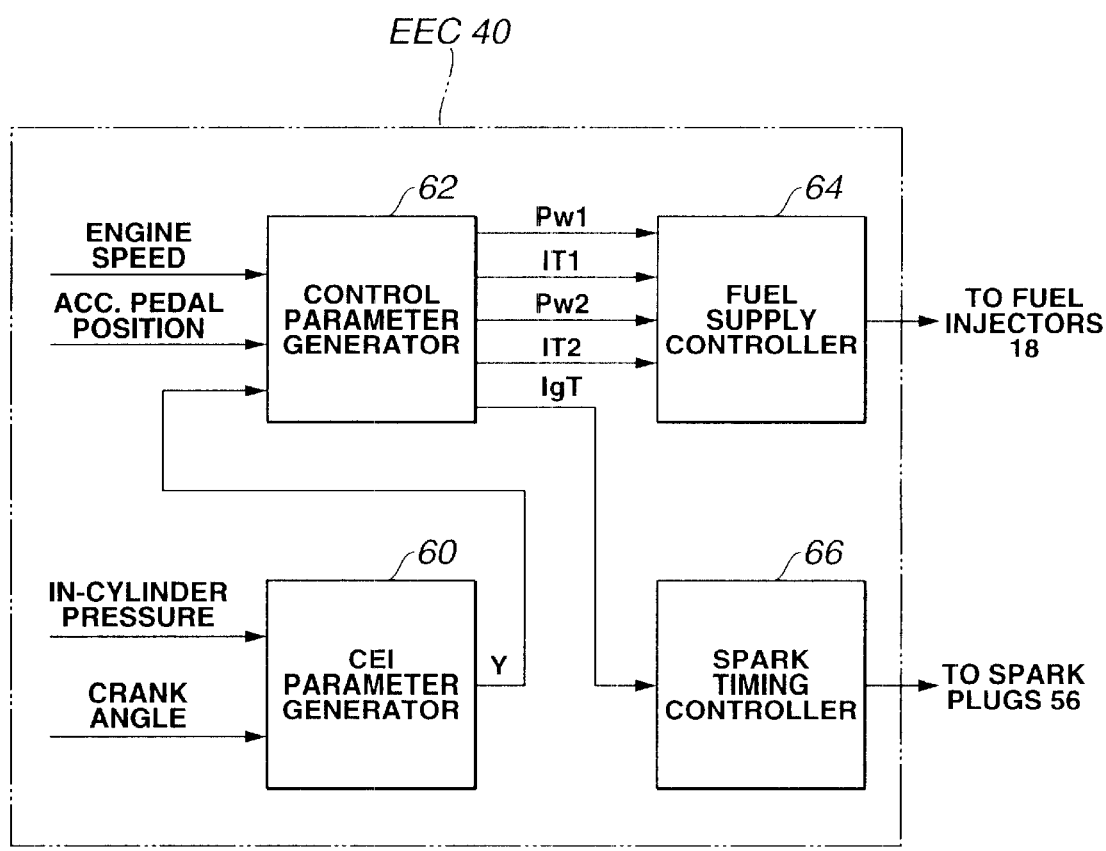
FIG. 2 is a block diagram illustrating a combustion event indicative (CEI) parameter generator and a control parameter generator according to the present invention.

FIG. 2 is a block diagram illustrating a CEI parameter generator 60, a control parameter generator 62, a fuel supply controller 64, and a spark timing controller 66 according to the present invention. CEI and control parameter generators 60 and 62, and fuel supply and spark timing controllers 64 and 66 are preferably implemented in EEC 40.

In the embodiment illustrated in FIG. 2, CEI parameter generator 60 generates a CEI parameter, indicated generally by reference character Y, based on cylinder pressure and crank angle. CEI parameter Y represents combustion speed or ignition timing of auto-ignited combustion. Examples of CEI parameter are (1) the maximum of cylinder pressure elevation rate $dP/\theta_{max}$, (2) the maximum of cylinder pressure $P_{max}$, and (3) crank position at which cylinder pressure hits the maximum $\theta P_{max}$. CEI parameter generator 60 may rely on output of a knock sensor instead of output of cylinder pressure sensor in generating CEI parameter Y. In this case, CEI parameter Y is (4) amplitude of cylinder vibration. CEI parameter Y is provided to control parameter generator 62.

Control parameter generator 62 generates control parameters based on CEI parameter Y, engine speed (Ne) and accelerator pedal position (VAPO). In the embodiment, examples of control parameters are pulse width Pw1 of first fuel injection, injection timing IT1 of first fuel injection, pulse width Pw2 of second fuel injection, injection timing IT2 of second fuel injection, and ignition timing IgT. Pulse widths Pw1, Pw2, and injection timings IT1 and IT2 are provided to fuel supply controller 64. Ignition timing IgT is provided to spark timing controller 66. Fuel supply controller 64 controls injections pulses supplied to fuel injectors 18. Spark timing controller 66 controls spark timing signal supplied to spark plugs 56.

Figure 4:
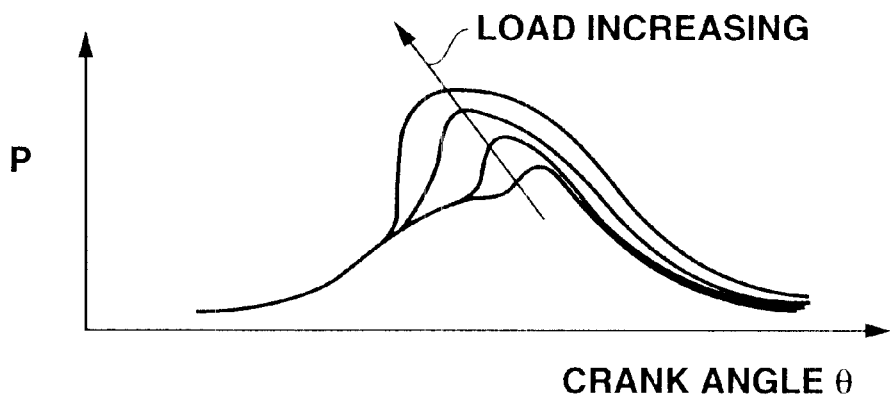
FIG. 4 is a cylinder pressure diagram of auto-ignited combustion of homogeneous air/fuel mixture, illustrating the varying of pressure contour lines of engine cycles with differing loads.
Figure 5:
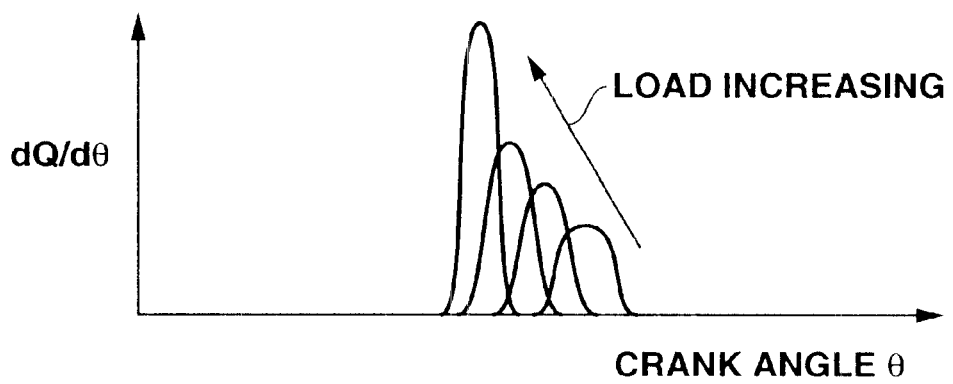
FIG. 5 is a heat elevation rate diagram of auto-ignited combustion of homogeneous air/fuel mixture, illustrating the varying of heat elevation rate contour lines of engine cycles with differing loads.
Figure 6:
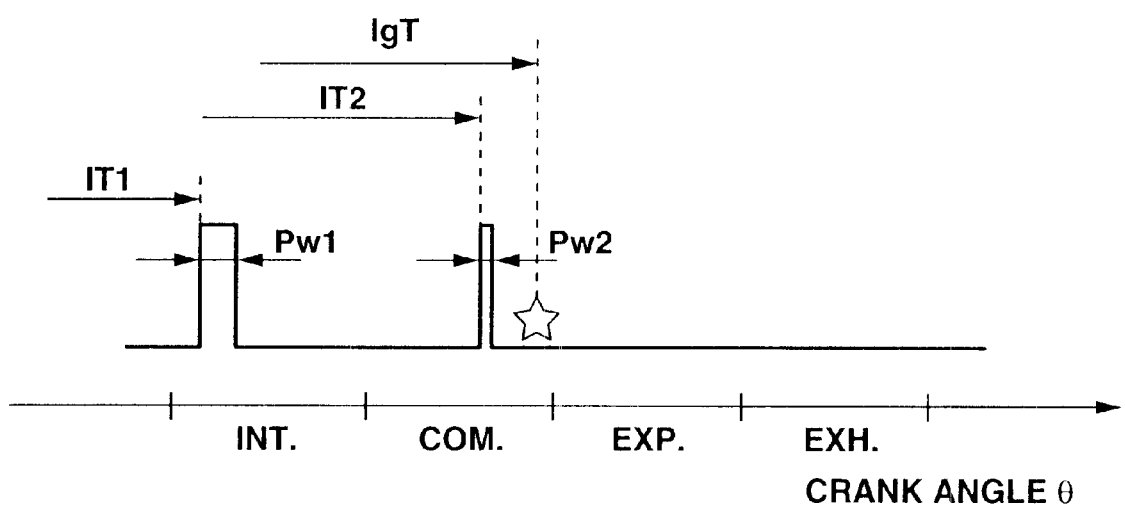
FIG. 6 is a timing diagram illustrating fuel injection pulses and an ignition timing point for one engine cycle.

Referring now to FIGS. 4 and 5, the characteristic of auto-ignited combustion of homogeneous air/fuel mixture charge will be described as a comparative example for facilitating understanding of the preferred embodiment according to the present invention. In the preferred embodiment, the stratified air/fuel mixture charge is created including a localized air/fuel mixture portion that is ignitable by a spark, and combustion of the localized air/fuel mixture portion induces auto-ignited combustion of the surrounding or background air/fuel mixture.

FIGS. 4 and 5 clearly illustrate the characteristic of auto-ignited combustion of homogeneous air/fuel mixture charge. In FIG. 4, the vertical axis represents cylinder pressure P, while the horizontal axis represents crank angle θ. The cylinder pressure contour lines illustrated in FIG. 4 indicate that, as the engine load increases, the maximum of cylinder pressure ($P_{max}$) for each engine cycle increases, and crank angle at which the cylinder pressure achieves the maximum ($\theta P_{max}$) for each engine cycle is advanced. In FIG. 5, the vertical axis represents the heat release rate with respect to crank angle (dQ/dθ) and the horizontal axis represents crank angle θ. The area surrounded by each of the contour lines represents the total amount of heat release (Q). The contour lines illustrated in FIG. 5 indicate that, as the engine load increases, the total amount of heat release Q increases, and the heat generation timing is advanced.

In order to meet the varying of load, the intake air is unthrottled with the engine throttle kept at the wide-open position (WOT), and the amount of fuel supply is varied to adjust the engine output. The amount of fuel supply is increased as the engine load is increased.

Increasing the amount of fuel supply for one engine cycle causes an increase in the total amount of heat release Q. The increased supply of fuel lowers the air/fuel ratio of the air/fuel mixture charge, thereby causing an increase in chemical reaction speed, i.e., combustion speed, between air and fuel in the charge. This shortens the duration of combustion and advances the heat generation timing. Many times, the increasing of the total amount of heat release Q, the shortening of the duration of combustion, and the advancing of the heat generation timing restrict operating conditions, at which the auto-ignited combustion may be performed, to lower engine load due to difficulties in suppressing combustion induced noise to a sufficiently low level.

Explaining more in detail, the elevation rate of cylinder pressure dP/dθ and the maximum cylinder pressure $P_{max}$ increase appreciably as the engine load increases due to combination between increased total amount of heat release Q, shortened duration of combustion, and advanced heat generation timing. The increases of dP/dθ and $P_{max}$ may cause combustion-induced noise to exceed an acceptable level during operating conditions with high load. Besides, the increased elevation rate of cylinder pressure dP/dθ may induce knock-like cylinder vibration, causing a further increase in noise level. Accordingly, the operating conditions, at which the auto-ignited combustion may be performed, are restricted to lower engine load.

In order to perform auto-ignited combustion during operating conditions with increased engine load by removing the restriction, the elevation rate of cylinder pressure dP/dθ and the maximum of cylinder pressure $P_{max}$ must be suppressed satisfactorily to allow an increase of the amount of fuel supply in response to an increase of the engine load. In the preferred embodiment of the present invention, the heat generation timing of auto-ignited combustion is separated from the varying of the amount of fuel supply with differing engine load.

Referring now to FIGS. 6, 7A–7D, 8, and 9, the preferred embodiment according to the present invention will be described. In the embodiment, fuel supply controller 62 performs a split injection for each engine cycle via fuel injectors 18. The split injection includes a first fuel injection for each engine cycle during intake stroke and a second fuel injection in the same engine cycle during compression stroke. This creates, within combustion chamber 8, a stratified air/fuel mixture charge. The stratified air/fuel mixture charge includes a first air/fuel mixture spreading evenly through the whole area of the combustion chamber 8 and a second localized air/fuel mixture portion in the neighborhood of spark plug 56. The second air/fuel mixture portion is ignitable by a spark. The air/fuel ratio of the first air/fuel mixture is greater than that of the second air/fuel mixture portion. Spark plug 56 is activated under the control of spark timing controller 66 to produce a spark. This spark ignites the second air/fuel mixture portion to initiate spark-ignited combustion. Thermal expansion due to this spark-ignited combustion compresses the surrounding first air/fuel mixture to a level at which the first air/fuel mixture would be auto-ignited. This type of combustion may be referred, herein, as "a two-stage combustion." The spark-ignited combustion of the second air/fuel mixture portion constitutes the first stage, and the auto-ignited combustion of the first air/fuel mixture constitutes the second stage.

Figure 7A:
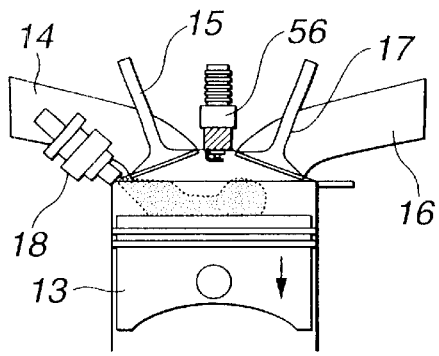
FIGS. 7A to 7D are schematic sectional diagrams, illustrating piston intake and compression strokes in the same engine cycle.
Figure 7B:
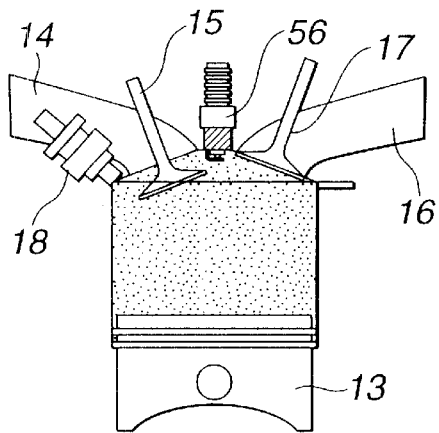
Figure 7C:
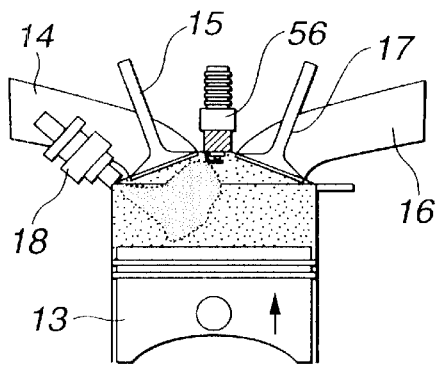
Figure 7D:
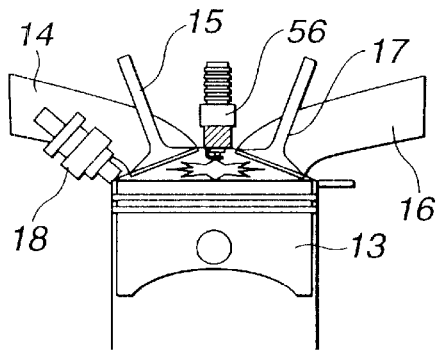

With reference to FIGS. 6 and 7A–7D, the split injection and the resulting stratified air/fuel mixture charge will be further described. First fuel injection pulse, having width Pw1, energizes fuel injector 18 at a first injection timing IT1 to perform first fuel injection of a first quantity of fuel (see FIGS. 6 and 7A) during intake stroke. The fuel injected by the first fuel injection is diffused evenly through the whole area of combustion chamber 8 as shown in FIGS. 7B and 7C. In other embodiment, the first fuel injection may be performed during early timing of compression stroke in order to account for combustion chamber wall wetting effects. The first fuel injection pulse is followed by second fuel injection pulse. The second fuel injection pulse, having width Pw2, energizes fuel injector 18 at a second injection timing IT2 to perform second fuel injection of a second quantity of fuel as shown in FIG. 7C. Fuel injected by the second fuel injection is urged to move toward spark plug 56 during ascending movement of piston 13, overlying the first air/fuel mixture to create localized second air/fuel mixture portion in the neighborhood of spark plug 56. As shown in FIG. 7D, at ignition timing IgT, spark plug 56 is activated to produce a spark to ignite the second air/fuel mixture portion.

Figure 8:
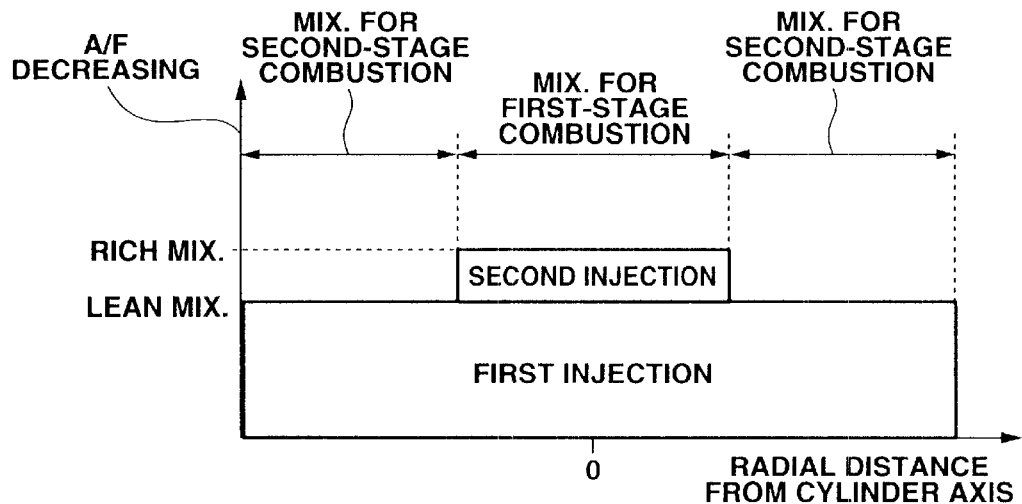
FIG. 8 is a graphical representation of cylinder content due to first and second fuel injections in the same engine cycle.

Referring to FIG. 8, the creation of the stratified air/fuel mixture charge due to split injection will be further described. The horizontal axis in FIG. 8 represents radial distance from the cylinder axis. The position of cylinder axis in indicated by the reference numeral 0. The vertical axis in FIG. 8 represents the air/fuel ratio. The horizontal measure of a box labeled "FIRST INJECTION" represents diffusion of fuel injected by the first fuel injection toward the cylindrical combustion wall at around ignition timing point. The elevation of the top of this box at a radial position indicates the air/fuel ratio of first air/fuel mixture, which is created due to first fuel injection, at the radial position. The horizontal measure of a box labeled "SECOND INJECTION" represents local or limited diffusion of fuel injected by the second fuel injection at around the ignition timing point. The box labeled "SECOND INJECTION" overlies the box labeled "FIRST INJECTION" to visualize superimposition of the fuel injected by the second fuel injection and the fuel injected by the first injection to form localized second air/fuel mixture portion. The air/fuel ratio of the second air/fuel mixture portion is indicated by elevation of the top of the box labeled "SECOND INJECTION." It will be understood from FIG. 8 that the second air/fuel mixture portion is spark-ignited to perform first-stage combustion, and the surrounding first air/fuel mixture is auto-ignited to perform second-stage combustion.

Figure 9:
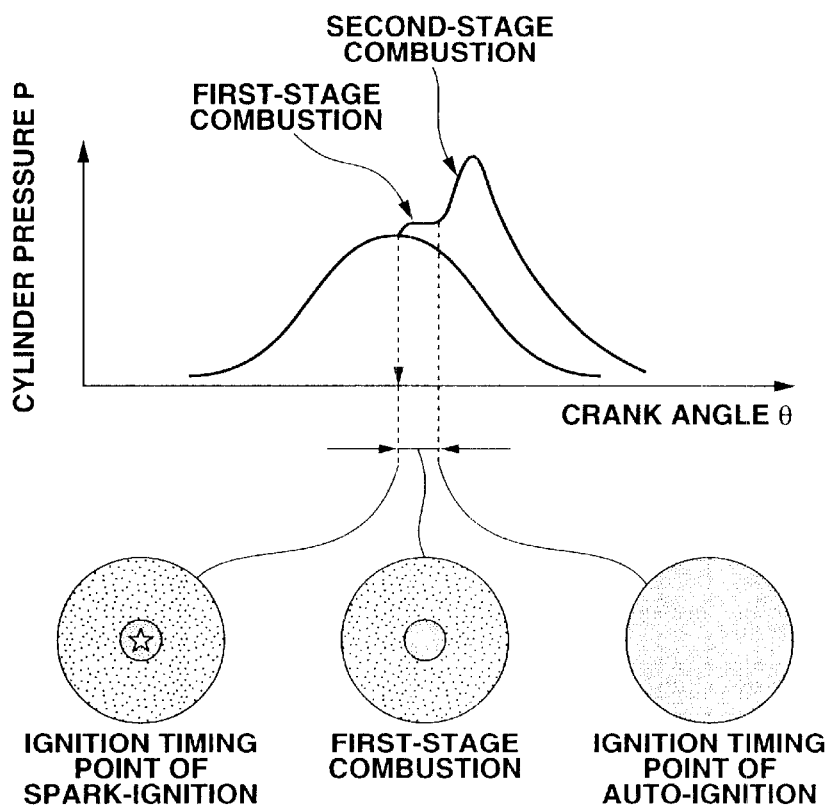
FIG. 9 is a cylinder pressure diagram of two-stage combustion of stratified air/fuel mixture charge together with views illustrating the progress of combustion.

Referring to FIG. 9, the illustrated cylinder pressure contour line clearly indicates the first-stage combustion event followed by the second-stage combustion event The three views, arranged below the cylinder pressure diagram in FIG. 9, illustrate a spark at ignition timing point of spark-ignition of the localized second air/fuel mixture portion, first-stage combustion initiated by the spark, and ignitions from many sites of the first air/fuel mixture at ignition timing point of auto-ignition.

With continuing reference to FIG. 9, it is appreciable by one ordinary-skill in the art that the second air/fuel mixture portion may be ignited at a desired ignition timing point due to a spark provided by spark plug 56, which is activated under control of spark timing controller 66. Thus, spark timing controller 66 has gained its control over determination of ignition timing point of the second air/fuel mixture portion. On the other hand, the elevation of in-cylinder temperature due to compression has lost its control the determination of ignition timing point. In order to ensure ignition by spark, the second air/fuel mixture portion needs to be sufficiently rich. Combustion of such rich air/fuel mixture would produce nitrogen oxides (NOx) emission. In order to reduce NOx emission, reduction of the amount of the second air/fuel mixture portion to a sufficiently low level is desired.

The second air/fuel mixture portion is disposed within and thus surrounded by the first air/fuel mixture portion. As mentioned before, the thermal expansion of the second air/fuel mixture portion due to its combustion applies pressure to and compress the first air/fuel mixture to the threshold level at which the first air/fuel mixture would be auto-ignited. The pressure applied to the first air/fuel mixture needs to be controlled to adjust ignition timing point of the first air/fuel mixture. Proper controlling this pressure would enable the first air/fuel mixture to be auto-ignited at a desired ignition timing point after TDC during compression stroke. The volume of combustion chamber increases due to descending movement of piston 13 after the TDC. This volume increase suppresses elevation rate of cylinder pressure $dP/d\theta$ and the maximum cylinder pressure $P_{max}$, thus allowing an increase in the fuel quantity of the first air/fuel mixture to meet increased load demand.

As mentioned before, the amount of the second air/fuel mixture portion is restricted to sufficiently low level. The amount of heat generated by first-stage combustion of the second air/fuel mixture portion is restricted. Thus, the first air/fuel mixture for the subsequent second-stage combustion needs to possess an air/fuel ratio marginally leaner than a threshold air/fuel ratio at which the mixture would be auto-ignited due to compression by piston 13.

It will now be appreciated by one ordinary skilled in the art that reduction of NOx emission is achieved by the small-scale first-stage combustion of the second air/fuel mixture portion. It will also be appreciated that properly controlling the spark-ignition timing point of the first-stage combustion enables the subsequent second-stage combustion to be initiated at an ignition timing point after TDC during compression stroke. Because of the second-stage combustion during volume thermal expansion after the TDC, the elevation rate of cylinder pressure $dP/d\theta$ and the maximum pressure $P_{max}$ can be satisfactorily suppressed to allow performance of auto-ignited combustion at operating conditions with increased engine load demand.

Operating conditions at which the second-stage auto-ignited combustion may be satisfactorily performed include temperature, pressure and air/fuel ratio. Precise control of temperature, pressure and air/fuel ratio is needed in severe environment to provide auto-ignition without any misfire. Examples of parameters representing the environment are cylinder wall temperature, intake air temperature, atmospheric pressure, octane number of fuel, and an error of fuel supply. Such environmental parameters have great influence on auto-ignition timing point of the second-stage combustion. If the auto-ignition timing point of second-stage combustion is greatly advanced due to such environmental causes, the maximum of elevation rate of cylinder pressure $dP/d\theta_{max}$ and/or the maximum cylinder pressure $P_{max}$ become excessively high. If-the auto-ignition timing point of second-stage combustion is greatly retarded, misfire and/or a reduction in combustion efficiency occur.

As will be appreciated by one ordinary skilled in the art, the control logic to determine combustion type and injection type, CEI parameter generator 60, and control parameter generator 62 may be implemented in hardware, or a combination of hardware and software. The various functions are preferably carried out by a programmed microprocessor, but may include one or more functions implemented by dedicated electric, electronic, or integrated circuits. As will also be appreciated, they may be implemented using any one of a number of known programming and processing techniques or strategies and is not limited to the order or sequence illustrated here for convenience. For example, interrupt or event driven processing is typically employed in real-time control applications, such as control of a vehicle engine. Likewise, parallel processing or multi-tasking systems may be used. The present invention is independent of the particular programming language, operating system, or processor.

Figure 10:
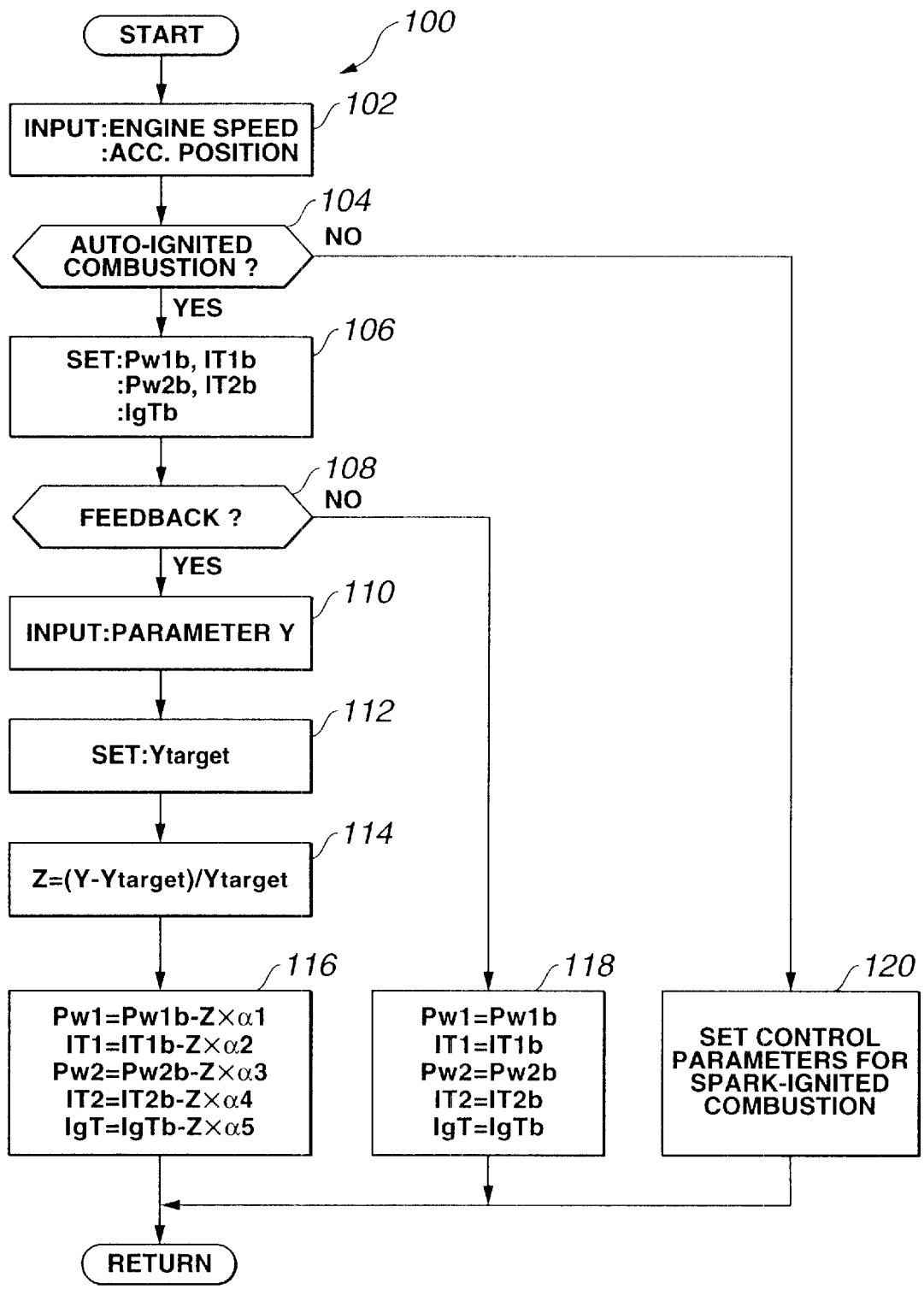
FIG. 10 is a flow diagram illustrating a control routine including software implementation of control parameter generator according to the present invention.

Referring to FIG. 10, a control routine to determine control parameters for fuel supply and spark timing controller 64 and 66 is indicated by the reference numeral 100. This control routine includes software implementation of control parameter generator 62. In the embodiment, CEI parameter generator is associated with or includes cylinder pressure sensor 20 and a crank angle sensor that generates signals POS and REF.

In FIG. 10, at block 102, MPU 44 of EEC 40 inputs information as to engine speed Ne and accelerator pedal position VAPO. At the next block 104, MPU 44 determines the type of combustion required; auto-ignited combustion or spark-ignited combustion, from the combustion type map shown in FIG. 11 using engine speed Ne and accelerator pedal position VAPO. In this case, accelerator pedal position VAPO is used as representing engine load. If, at block 104, it is determined that auto-ignited combustion is required (YES), the process goes to block 106. If, at block 104, it is determined that spark-ignited combustion is required, the process goes to block 120.

At block 106, MPU 44 finds base values of various control 30 parameters (Pw1$b$, IT1$b$, Pw2$b$, IT2$b$, and IgT$b$) in maps indexed by engine speed Ne and accelerator pedal position VAPO. The maps are provided for the control parameters, respectively. The reference character Pw1$b$ indicates a base value of pulse width of first fuel injection. The reference character IT1$b$ indicates a base value of beginning timing of the first fuel injection. The reference character Pw2*b* indicates a base value of pulse width of second fuel injection. The reference character IT2*b* indicates a base value of beginning timing of the second fuel injection. The reference character IgTb indicates a base value of spark ignition timing. After block 106, the process goes to block 108.

Figure 11:
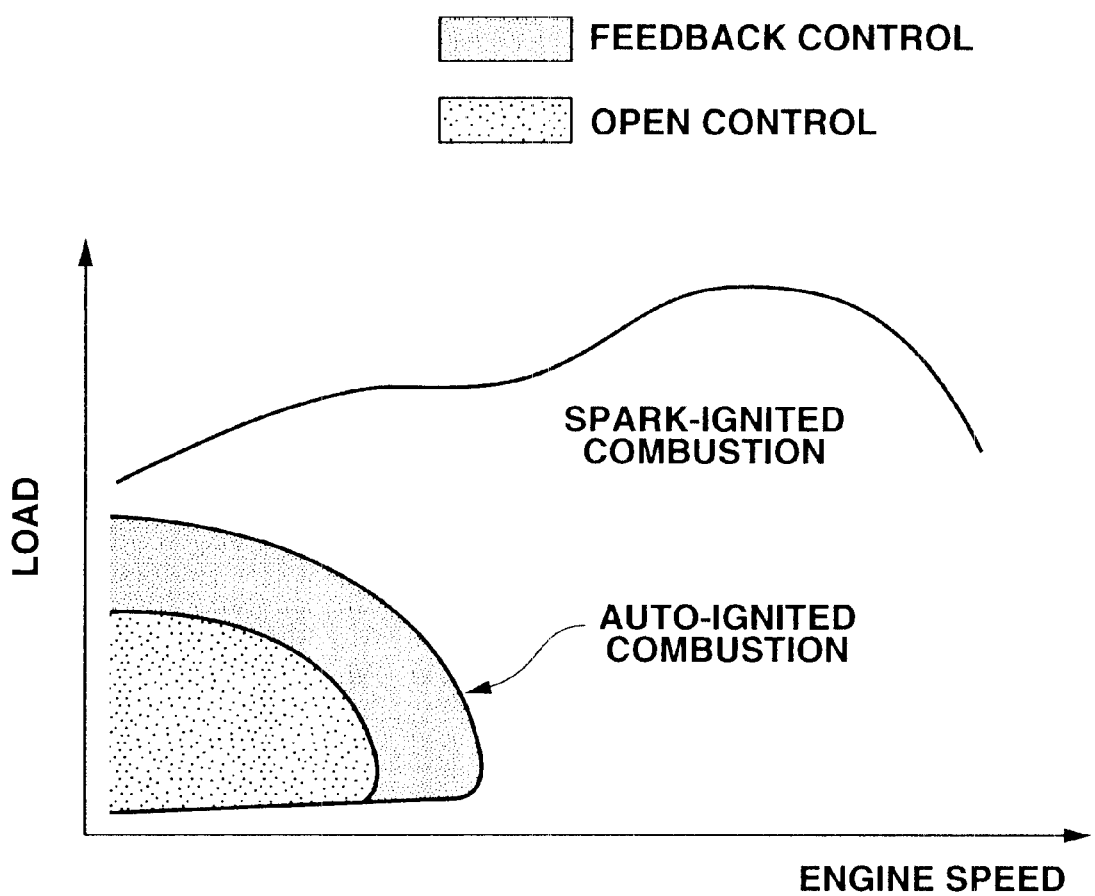
FIG. 11 is a combustion type map.

At block 108, MPU 44 determines the type of control required: feedback control or open control, from the combustion type map shown in FIG. 11 using engine speed Ne and accelerator pedal position VAPO With reference to FIG. 11, operating conditions at which open control of auto-ignited combustion may be performed are restricted to lower engine loads so that feedback control is performed at operating conditions with increased engine load. Feedback control might be performed over the whole operating conditions at which auto-ignited combustion may be performed. This would increase operation load on MPU 44. Accordingly, in order to reduce operation load on MPU 44, the operating conditions at which feedback control may be performed are restricted to relatively high loads.

If, at block 108, MPU 44 determines that feedback control is required (YES), the process goes to block 110. If, at block 108, MPU 44 determines that open control is required (NO), the process goes to block 118.

At block 110, MPU 44 inputs CEI parameter Y from CEI parameter generator 60 (see FIG. 2). CEI parameter Y is related with one of combustion speed and ignition timing of second-stage auto-ignited combustion. In the embodiment, CEI parameter generator 60 calculates elevation rate of cylinder pressure $dP/d\theta$ from cylinder pressure P and crank angle $\theta$ and determines the maximum elevation rate of cylinder pressure $dP/d\theta_{max}$ for each engine cycle. CEI parameter generator 60 generates, as CEI parameter Y, the determined maximum elevation rate of cylinder pressure $dP/d\theta_{max}$. The process goes to block 112 after block 110.

At block 112, MPU 44 finds a target value $Y_{target}$ of CEI parameter Y from a map indexed by engine speed Ne and accelerator pedal position VAPO. At the next block 114, MPU 44 calculates a deviation $Y-Y_{target}$ and determines a ratio Z that is expressed as:

$$Z=(Y-Y_{target})/Y_{target} \quad (1).$$

At the next block 116, MPU 44 determines control parameters (Pw1, IT1, Pw2, IT2, IgT), which are expressed as:

$$Pw1=Pw1b-Z\times\alpha 1 \quad (2)$$

$$IT1=IT1b-Z\times\alpha 2 \quad (3)$$

$$Pw2=Pw2b-Z\times\alpha 3 \quad (4)$$

$$IT2=IT2b-Z\times\alpha 4 \quad (5)$$

$$IgT=IgTb-Z\times\alpha 5 \quad (6)$$

where: $\alpha 1$ to $\alpha 5$ are control gains associated with the control parameters Pw1, IT1, Pw2, IT2, and IgT, respectively.

In the illustrated embodiment, all of the control parameters are modified according to the feedback control based on the ratio Z. There is no need to modify all of the control parameters according to the feedback control In the case some of the control parameters are left unmodified, the base values of such control parameters are used as the final values of such control parameters.

Modifications of the control parameters provide slightly different effects on combustion, respectively. Accordingly, it is preferred to select appropriate one or ones out of the control parameters to operating conditions and modify such selected one or ones. This control may be realized by varying the amount of control gains $\alpha 1$ to $\alpha 5$ with differing operating conditions.

If, at block 108, it is determined that feedback control is not required (NO), the process goes to block 118. At block 118, MPU 44 sets the base values Pw1*b*, IT1*b*, Pw2*b*, IT2*b*, and IgTb as the final values of control parameters Pw1, IT1, Pw2, IT2, and IgT, respectively.

If, at block 104, it is determined that auto-ignited combustion is not required (NO), the process goes to block 120. At block 120, MPU 44 determines control parameters for spark-ignited combustion against engine speed Ne and accelerator pedal position VAPO.

The control parameters are provided to fuel supply and spark timing controllers 64 and 66 as shown in FIG. 2.

In the embodiment, the maximum elevation rate of cylinder pressure $dP/d\theta_{max}$ is employed as CEI parameter Y in order to suppress combustion noise within an acceptable range.

In another embodiment, the maximum cylinder pressure $P_{max}$ may be employed as CEI parameter Y in order to suppress cylinder pressure P below a maximum cylinder pressure level allowed taking into account of mechanical strength of engine 10 as well as combustion noise.

In still another embodiment, the crank angle $\theta P_{max}$ at which the cylinder pressure P becomes the maximum $P_{max}$ may be employed as CEI parameter Y in order to minimize the effect due to deterioration of pressure sensor 20 with age. Cost reduction may be expected because linearly of the sensor is not required.

In other embodiment, the amplitude of cylinder vibration may be employed as CEI parameter Y in order to suppress knock noise. In this case, a relatively inexpensive knock sensor may be used instead of a cylinder pressure sensor.

Referring to FIG. 12, if and then rules between the above-mentioned four different examples of CEI parameter Y and control parameters Pw2, Its, Pw1, IT1, and IgT will be described. The rules are as follows:

(1) If CEI parameter $dP/d\theta_{max}$ is greater than a target value (TA), then control parameter Pw2 is reduced and/or control parameter IT2 is retarded and/or control parameter Pw1 is reduced and/or control parameter IT1 is advanced and/or control parameter IgT is retarded.

(2) If CEI parameter $P_{max}$ is greater than a target value (TA), then control parameter Pw2 is reduced and/or control parameter IT2 is retarded and/or control parameter Pw1 is reduced and/or control parameter IT1 is advanced and/or control parameter IgT is retarded.

(3) If CEI parameter $\theta P_{max}$ is earlier than a target value (TA), then control parameter Pw2 is reduced and/or control parameter IT2 is retarded and/or control parameter Pw1 is reduced and/or control parameter IT1 is advanced and/or control parameter IgT is retarded.

(4) If CEI parameter in the form of the amplitude of cylinder vibration is greater than a target value (TA), then control parameter Pw2 is reduced and/or control parameter IT2 is retarded and/or control parameter Pw1 is reduced and/or control parameter IT1 is advanced and/or control parameter IgT is retarded.

Referring to FIGS. 13–16, how modifications of control parameters have influence upon formation of stratified charge and the second-stage combustion will be described. Fuel injection timing of each fuel injection primarily determines the extent of diffusion of the injected fuel at round TDC during compression stroke, thus determining the volume of air/fuel mixture. Specifically, if the injection timing of the second fuel injection is at an early point, the injected fuel will be diffused widely in radial directions from the cylinder axis until TDC during compression stroke, thus providing a large volume of air/fuel mixture. On the other hand, if the injection timing of the second fuel injection is at a late point, the injected fuel will be diffused less widely in radial directions from the cylinder axis until TDC during compression stroke, thus providing a small volume of air/fuel mixture.

Injection timing and fuel quantity determine the air/fuel ratio of mixture formed at TDC during compression stroke. With regard to the second air/fuel mixture portion, fuel quantity of first fuel injection, fuel quantity of second fuel injection, and injection timing of second fuel injection determine the air/fuel ratio of the second air/fuel mixture portion that is formed at the TDC.

With regard to the first-stage combustion, spark timing and the air/fuel ratio of second air/fuel mixture portion determine timing of heat generated by the first-stage combustion. The timing of heat generation follows after a delay from the spark timing. This delay may become short if the air/fuel ratio is low, or it may become long if the air/fuel ratio is high.

The product of the air/fuel ratio of the second air/fuel mixture portion and the volume thereof determines the amount of heat generated by the first-stage combustion. The amount and timing of heat generation are determined by injection timings and fuel quantities of the first and second fuel injections and by the spark timing. They have influence on the auto-ignition timing of the subsequent second-stage combustion of the first air/fuel mixture.

Figure 13:
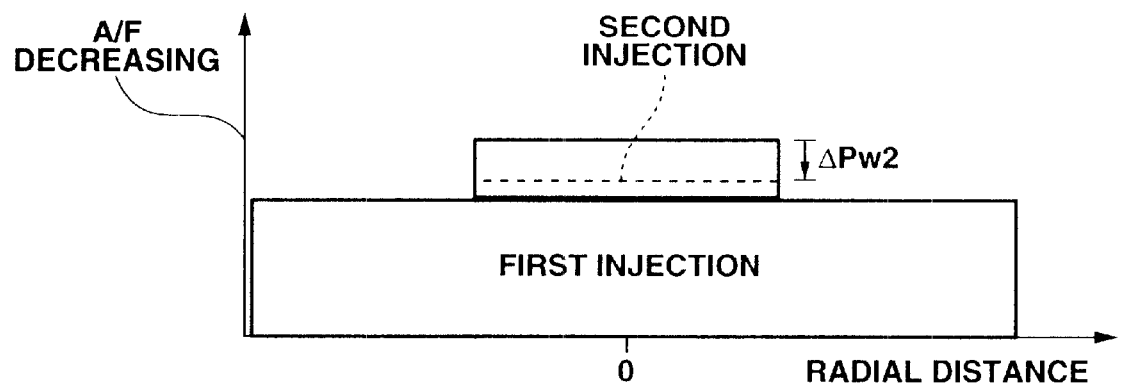
FIG. 13 is a similar view to FIG. 8 illustrating how the cylinder content varies if the pulse width of second fuel injection is reduced by an amount $\Delta Pw2$.

With reference to FIGS. 12 and 13, let us now consider the case where pulse width Pw2 of second fuel injection is reduced by an amount ΔPw2 when CEI parameter $dP/d\theta_{max}$ is greater than the target value TA. This reduction in pulse width Pw2 causes an increase in air/fuel ratio of the second air/fuel mixture portion down to a level as indicated by the dotted line in FIG. 13. This increase in air/fuel ratio causes an increase in delay from the spark timing to the timing of heat generation and also a reduction in amount of heat generation, thus causing a retard in the auto-ignition timing of the second-stage combustion. This retarded auto-ignition timing works to lower CEI parameter $dP/d\theta_{max}$. As will be appreciated by one ordinary skilled in the art, formations of NOx and/or soot are more pronounced if the pulse width Pw2 is excessively increased. Thus, the pulse width Pw2 must be controlled accounting for the likelihood of NOx and/or soot formations.

Figure 14:
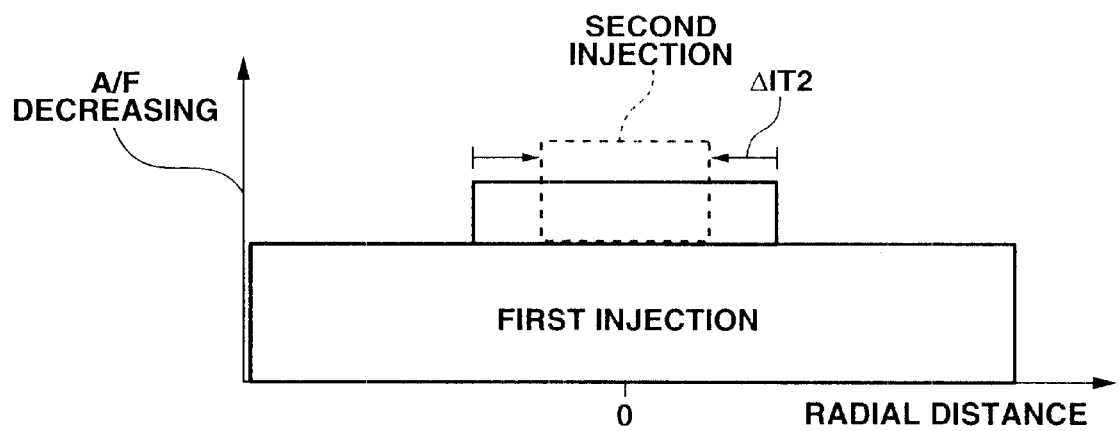
FIG. 14 is a similar view to FIG. 8 illustrating how the cylinder content varies if the injection timing of second fuel injection is retarded by an amount $\Delta IT2$.

With reference to FIG. 14, let us next consider the case where injection timing IT2 of second fuel injection is retarded by an amount IT2. This retard in injection timing IT2 causes a reduction in the extent of dissipation of the injected fuel Thus, the volume and air/fuel ratio of second air/fuel mixture portion are decreased as indicated by the dotted line in FIG. 14. These changes may be advantageously used to optimize the auto-ignition timing of second-stage combustion.

Figure 15:
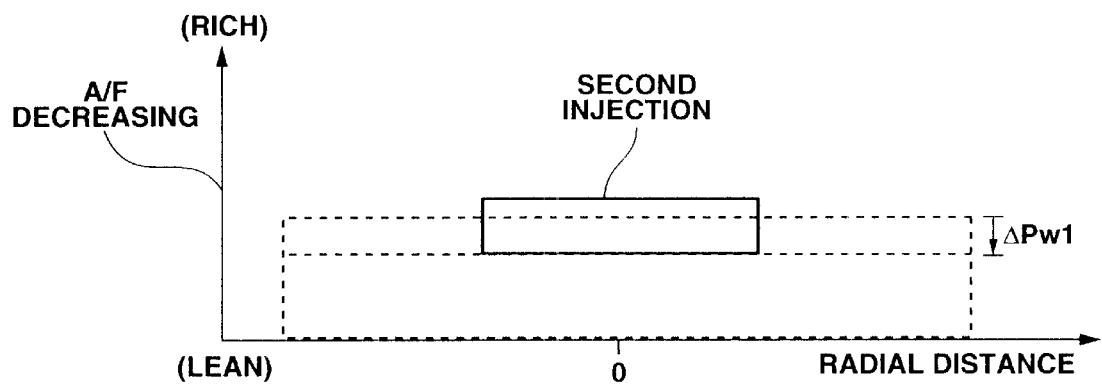
FIG. 15 is a similar view to FIG. 8 illustrating how the cylinder content varies if the pulse width of first fuel injection is reduced by an amount ΔPw1.

With reference now to FIG. 15, let us now consider the case where pulse width Pw1 of first fuel injection is reduced by an amount ΔPw1. This reduction in pulse width Pw1 causes an increase in air/fuel ratio of the first air/fuel mixture to a level as indicated by the dotted line in FIG. 15, thus causing an increase in air/fuel ratio of second air/fuel mixture portion. These changes may be advantageously used to optimize the auto-ignition timing of second-stage combustion.

By varying the pulse width Pw1 according to the feedback control, the air/fuel ratio changes. This change in air/fuel ratio, however, is small enough to leave the stratification of the charge unaltered, thus preventing an increase in Nox emission. This control technique may be advantageously used during operating conditions at which change in load is little because most of fuel is injected during first fuel injection.

Figure 16:
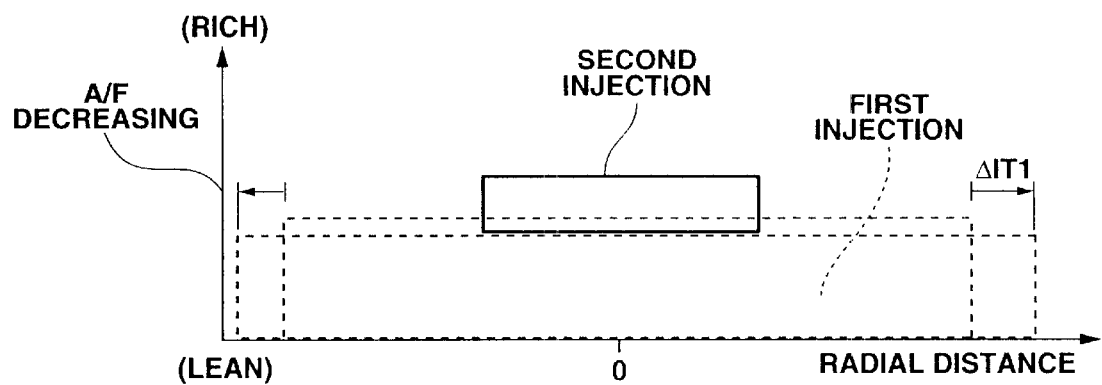
FIG. 16 is a similar view to FIG. 8 illustrating how the cylinder content varies if the injection timing of first fuel injection is advanced by an amount ΔIT1.

With reference to FIG. 16, let us consider the case where injection timing IT1 of first fuel injection is advanced by an amount ΔIT1. This advance in injection timing IT1 causes an increase in the extent of dissipation of the injected fuel. Thus, the volume and air/fuel ratio of first air/fuel mixture portion are increased as indicated by the dotted line in FIG. 16. These changes may be advantageously used to optimize the auto-ignition timing of second-stage combustion.

This control technique is advantageous in forming a mixture without any local rich portions. Thus, accidental occurrence of NOx emission during feedback control may be precluded. The amount of change in air/fuel ratio of the second air/fuel mixture portion, however, is small during feedback control.

Let us now consider the case where spark timing IgT is retarded. This control technique may be advantageously used to optimize the auto-ignition timing of second-stage combustion because the spark timing directly controls timing of heat generation by first-stage combustion. As a result, high combustion stability may be accomplished.

Preferably, the injection timing IT2 of second fuel injection is adjusted in cooperation with the adjustment of the spark timing to ensure stable ignitability of second air/fuel mixture portion.

The variation of shaft torque may be suppressed by keeping the total of pulse widths Pw1 and Pw2 of first and second fuel injections at a predetermined relationship with the engine load.

It will now be appreciated by one ordinary skilled in the art that, in the embodiments, operating conditions at which auto-ignited combustion may be performed are extended to high loads by allowing the auto-ignition timing of the second-stage auto-ignited combustion of the first air/fuel ratio to occur after TDC during compression stroke.

It will also appreciated that, in the embodiments according to the present invention, the retarded ignition timing point after the TDC at which the first air/fuel mixture is auto-ignited is varied in response to CEI parameter that is related with one of combustion speed and the ignition timing point of auto-ignited combustion of the first air/fuel mixture.

It will further be appreciated that, in the embodiments, the control parameter generator 62 modifies, in response to the CEI parameter, control parameters of fuel supply controller 64 and spark timing controller 66 to vary the amount and timing of heat generation by the first stage-combustion of the second air/fuel mixture portion (see FIG. 2).

As will be readily appreciated by one ordinary skilled in the art, in the embodiments according to the present invention, computer readable storage media 46 have stored therein data representing instructions executable by MPU 44 of EEC 40 to:

generate the CEI parameter;

determine at least one of the control parameters in response to the CEI parameter; and generate the determined control parameters.

The preferred embodiments are applicable to a spark ignited gasoline engine. Although the preferred embodiments are applicable to a spark ignited gasoline engine, the principles of the invention may also be used in spark ignited engines utilizing alternative liquid fuels.

While the present invention has been particularly described, in conjunction with preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

This application claims the priority of Japanese Patent Application No. P2000-385979, filed Dec. 19, 2000, the disclosure of which is hereby incorporated by reference in its entirety.

What is claimed is:

1. A system for controlling an internal combustion engine capable of performing auto-ignited combustion, using a spark timing controller and a fuel supply controller, which have disparate control parameters, the system comprising:

at least one combustion chamber;

a spark plug arranged to produce, under control of the spark timing controller, a spark within the combustion chamber at a predetermined location;

a fuel supply device operable to perform, under control of the fuel supply controller, a first fuel injection, for each engine cycle, to create a first air/fuel mixture within the combustion chamber and a second fuel injection, in the same engine cycle, to localize fuel to create, in the neighborhood of the spark plug, a localized second air/fuel mixture portion, which is ignitable by the spark produced at the predetermined location;

a combustion event indicative (CEI) parameter generator for generating a CEI parameter related with one of combustion speed and ignition timing point of auto-ignition of auto-ignited combustion of the first air/fuel mixture, within the combustion chamber, which follows spark-ignited combustion of the second air/fuel mixture portion; and a control parameter generator for determining at least one of the control parameters in response to CEI parameter and generating the determined control parameters.

2. The system as claimed in claim 1, wherein the control parameters include a fuel quantity of the first fuel injection, an injection timing of the first fuel injection, a fuel quantity of the second fuel injection, an injection timing of the second fuel injection, and a spark timing at which the spark plug produces spark.

3. The system as claimed in claim 1, wherein the CEI parameter generator processes output of a cylinder pressure sensor arranged to detect cylinder pressure within the combustion chamber.

4. The system as claimed in claim 1, wherein the CEI parameter generator processes output of a knock sensor arranged to detect knock occurrence within the combustion chamber.

5. The system as claimed in claim 1, wherein the CEI parameter is the maximum of elevation rate, with respect to crank angle, of cylinder pressure for each engine cycle.

6. The system as claimed in claim 1, wherein the CEI parameter is the maximum cylinder pressure for each engine cycle.

7. The system as claimed in claim 1, wherein the CEI parameter is the crank angle at which cylinder pressure reaches the maximum for each engine cycle.

8. The system as claimed in claim 1, wherein the CEI parameter is the amplitude of cylinder vibration for each engine cycle.

9. The system as claimed in claim 1, wherein the control parameter generator includes logic, according to which, if the CEI parameter falls in a predetermined relationship with a predetermined target value, then the control parameter generator reduces one of the control parameters representing the fuel quantity of the second fuel injection to retard ignition timing point of auto-ignition of the first air/fuel mixture.

10. The system as claimed in claim 1, wherein the control parameter generator includes logic, according to which, if the CEI parameter falls in a predetermined relationship with a predetermined target value, then the control parameter generator retards one of the control parameters representing the injection timing of the second fuel injection.

11. The system as claimed in claim 1, wherein the control parameter generator includes logic, according to which, if the CEI parameter falls in a predetermined relationship with a predetermined target value, then the control parameter generator retards one of the control parameters representing the spark timing to retard ignition timing point of auto-ignition of the first air/fuel mixture.

12. The system as claimed in claim 1, wherein the control parameter generator includes logic, according to which, if the CEI parameter falls in a predetermined relationship with a predetermined target value, then the control parameter generator reduces one of the control parameters representing the fuel quantity of the first fuel injection to adjust ignition timing point of auto-ignition of the first air/fuel mixture.

13. The system as claimed in claim 1, wherein the control parameter generator includes logic, according to which, if the CEI parameter falls in a predetermined relationship with a predetermined target value, then the control parameter generator retards one of the control parameters representing the injection timing of the first fuel injection to adjust ignition timing point of auto-ignition of the first air/fuel mixture.

14. The system as claimed in claim 1, wherein the control parameter generator determines the total of the fuel quantity of the first fuel injection and the fuel quantity of the second fuel injection as a predetermined function of the load request on the engine.

15. An internal combustion engine capable of performing auto-ignited combustion, using a spark timing controller and a fuel supply controller, which have disparate control parameters, the engine comprising:

at least one combustion chamber;

a spark plug arranged to produce, under control of the spark timing controller, a spark within the combustion chamber at a predetermined location;

a fuel supply device operable to perform, under control of the fuel supply controller, a first fuel injection, for each engine cycle, to create a first air/fuel mixture within the combustion chamber and a second fuel injection, in the same engine cycle, to localize fuel to create, in the neighborhood of the spark plug, a localized second air/fuel mixture portion, which is ignitable by the spark produced at the predetermined location;

a combustion event indicative (CEI) parameter generator for generating a CEI parameter related with one of combustion speed and ignition timing point of auto-ignited combustion of the first air/fuel mixture, within the combustion chamber, which follows spark-ignited combustion of the second air/fuel mixture portion; and a control parameter generator for determining at least one of the control parameters in response to CEI parameter and generating the determined control parameters.

16. The internal combustion engine as claimed in claim 15, wherein the control parameters include a fuel quantity of the first fuel injection, an injection timing of the first fuel injection, a fuel quantity of the second fuel injection, an injection timing of the second fuel injection, and a spark timing at which the spark plug produces spark.

17. A method for controlling an internal combustion engine capable of performing auto-ignited combustion, using a spark timing controller and a fuel supply controller, which have disparate control parameters, the method comprising:

performing, under control of the fuel supply controller, a first fuel injection, for each engine cycle, to create a first air/fuel mixture within the combustion chamber and a second fuel injection, in the same engine cycle, to localize fuel to create, in the neighborhood of the spark plug, a localized second air/fuel mixture portion, which is ignitable by the spark produced at the predetermined location;

producing a spark to ignite the second air/fuel mixture portion;

generating a CEI parameter related with one of combustion speed and ignition timing point of auto-ignition of auto-ignited combustion of the first air/fuel mixture, within the combustion chamber, which follows spark-ignited combustion of the second air/fuel mixture portion;

determining at least one of the control parameters in response to CEI parameter; and applying the determined control parameters to the fuel supply controller and the spark timing controller.

18. A system for controlling an internal combustion engine capable of performing auto-ignited combustion, using a spark timing controller and a fuel supply controller, which have disparate control parameters, the system comprising:

at least one combustion chamber;

a spark plug arranged to produce, under control of the spark timing controller, a spark within the combustion chamber at a predetermined location;

a fuel supply device operable to perform, under control of the fuel supply controller, a first fuel injection, for each engine cycle, to create a first air/fuel mixture within the combustion chamber and a second fuel injection, in the same engine cycle, to localize fuel to create, in the neighborhood of the spark plug, a localized second air/fuel mixture portion, which is ignitable by the spark produced at the predetermined location;;

an electronic engine controller including a microprocessor unit (MPU); and a computer readable storage media having stored therein data representing instructions executable by the MPU to:

generate a CEI parameter related with one of combustion speed and ignition timing point of auto-ignition of auto-ignited combustion of the first air/fuel mixture, within the combustion chamber, which follows spark-ignited combustion of the second air/fuel mixture portion; and determine at least one of the control parameters in response to the CEI parameter.

19. A system for controlling an internal combustion engine capable of performing auto-ignited combustion, using a spark timing controller and a fuel supply controller, which have disparate control parameters, the system comprising:

at least one combustion chamber;

means for producing, under control of the spark timing controller, a spark within the combustion chamber at a predetermined location;

means for performing, under control of the fuel supply controller, a first fuel injection, for each engine cycle, to create a first air/fuel mixture within the combustion chamber and a second fuel injection, in the same engine cycle, to localize fuel to create, in the neighborhood of the spark plug, a localized second air/fuel mixture portion, which is ignitable by the spark produced at the predetermined location;

means for generating a CEI parameter related with one of combustion speed and ignition timing point of auto-ignition of auto-ignited combustion of the first air/fuel mixture, within the combustion chamber, which follows spark-ignited combustion of the second air/fuel mixture portion; and means for determining at least one of the control parameters in response to the CEI parameter.

* * * * *